(No Model.)  
8 Sheets—Sheet 2.

F. W. COLBY.
SELF BINDING HARVESTER.

No. 439,292.  
Patented Oct. 28, 1890.

Witnesses.  
Arthur Johnson  
Jean Elliott

Inventor.  
Frank W. Colby  
By Burton & Burton  
his Atty.

(No Model.) 8 Sheets—Sheet 5.
F. W. COLBY.
SELF BINDING HARVESTER.

No. 439,292. Patented Oct. 28, 1890.

Witnesses.
Arthur Johnson.
Jean Elliott.

Inventor.
Frank W. Colby
By Burton and Burton
his attys (No Model.) 8 Sheets—Sheet 6.

F. W. COLBY.
SELF BINDING HARVESTER.

No. 439,292. Patented Oct. 28, 1890.

Witnesses.
Arthur Johnson
Jean Elliott

Inventor.
Frank W. Colby
By Burton and Burton
his attys

THE NORRIS PETERS CO., PHOTO-LITHO., WASHINGTON, D. C.

(No Model.)  8 Sheets—Sheet 7.

F. W. COLBY.
SELF BINDING HARVESTER.

No. 439,292.  Patented Oct. 28, 1890.

Witnesses.
Arthur Johnson
Jean Elliott

Inventor.
Frank W. Colby
By Burton and Burton
his Attys (No Model.) 8 Sheets—Sheet 8.

F. W. COLBY.
SELF BINDING HARVESTER.

No. 439,292. Patented Oct. 28, 1890.

Witnesses.
Arthur Johnson.
Jean Elliott.

Inventor.
Frank W. Colby
By Burton and Burton
his attys

UNITED STATES PATENT OFFICE.

FRANK W. COLBY, OF CHICAGO, ILLINOIS, ASSIGNOR TO WILLIAM DEERING, OF SAME PLACE.

SELF-BINDING HARVESTER.

SPECIFICATION forming part of Letters Patent No. 439,292, dated October 28, 1890.

Application filed May 8, 1889. Serial No. 310,066. (No model.)

*To all whom it may concern:*

Be it known that I, FRANK W. COLBY, a citizen of the United States, residing at Chicago, county of Cook, and State of Illinois, have invented certain new and useful Improvements in Self-Binding Harvesters, which are fully set forth in the following specification, reference being had to the accompanying drawings, forming a part thereof.

This invention relates to improvements upon a self-binding harvester of the general type which is represented in patents to La Verne W. Noyes, Nos. 358,062 and 358,064, dated February 22, 1887, and Nos. 366,501 and 366,502, dated July 12, 1887, of which the peculiarity is that the grain is handled in a standing position instead of being allowed to fall prostrate before being bound.

In the drawings, Fig. 6 is a detail plan, and Fig. 7 is a side elevation, of the tripping mechanism. Fig. 8 is a plan.

This machine is of that type in which the grain is lodged when it is cut upon a horizontal ledge or base in the rear of the sickle, standing up endwise thereon leaning against the conveyer, which extends upward from said ledge, the grain maintaining substantially this upstanding position throughout the entire process of binding, the binding and packing wheels and arms, therefore, being located and operating horizontally instead of vertically as in machines of a more familiar type.

Figure 1:
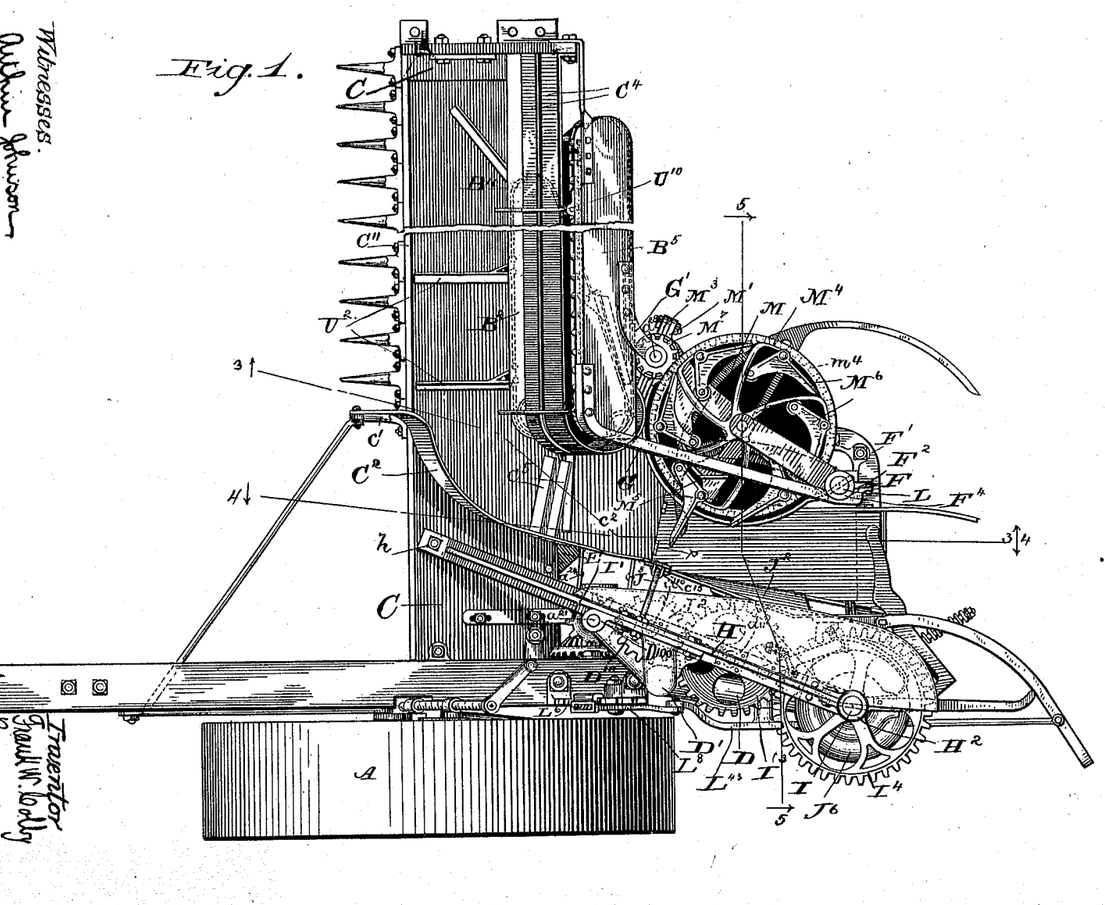
Figure 1 is a plan of the entire machine except the reel, which does not relate to this invention and is therefore omitted, certain parts being partly broken away to show other parts beneath them, and some other parts not pertaining to the invention are partly broken away.
Figure 2:
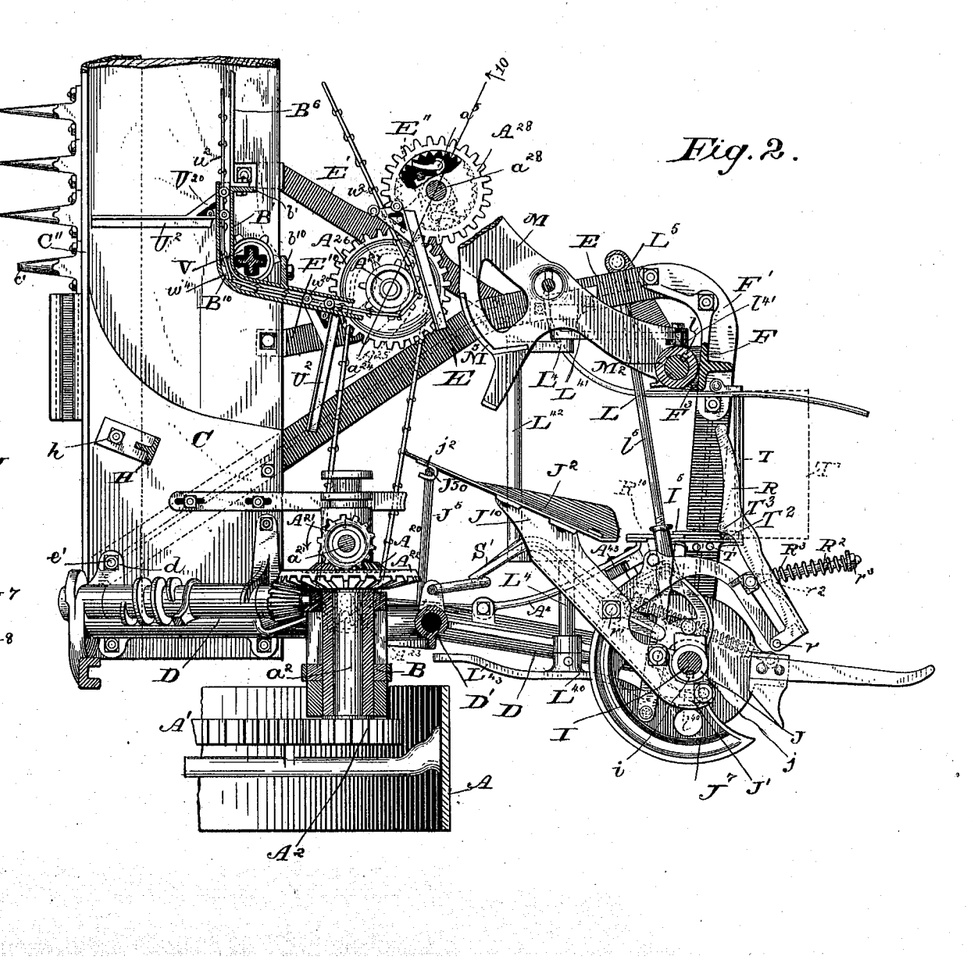
Fig. 2 is a horizontal sectional view, section of the parts shown in Fig. 3 being made at the planes indicated by the lines 2 2 on said Fig. 3, and section of the parts shown in Fig. 4 being made at the planes indicated by the lines 2 2 on said Fig. 4, said figure showing, also, in addition a part of the drive-wheel and the main driving-pinion and its shaft and the bearing of that shaft in horizontal axial section.

A is the drive-wheel, and rigid with it is the master gear-wheel A', which meshes with and drives the main driving-pinion A², said pinion having its driving-shaft located at the pivot of the principal frame to the drive-wheel frame, of which there is only shown the portion B, which is cut by a plane through said pivot in Fig. 2. I do not show or describe this wheel-frame further, because it is not part of my invention, and for any further understanding of the same would refer to Letters Patent No. 358,061, granted to LaVerne W. Noyes, dated February 22, 1887.

The principal frame comprises at the lower part the base C, the bracket D, which is rigidly secured to said base and projects rearward therefrom at the stubbleward end of the base and in proximity to the vertical plane of the drive-wheel, and the bracket E, which is also secured to the base C and projects rearward therefrom substantially in a horizontal plane extending to a point grainward from the rear end of the bracket D, and thence across stubbleward to said rear end to which it is rigidly joined at $e$.

The bracket E in the foregoing description includes the arm E', which has the jutting arms $E^{10}$ and $E^{11}$, which afford bearings for certain shafts of the conveying and packing mechanism, as hereinafter described. The arms E' and $E^{10}$ are joined to the base C, while the principal forwardly-extending arm of the bracket E has its foremost connection with and fastening to said base at the bolt $e'$, which in effect joins said arm directly to the bracket D, said bolt passing through the lug $d$, the base C, and thence into the bracket E. This bracket E is therefore broadly braced against the base C and rendered very rigid against any lateral strain tending to distort or displace it.

The conveyer-frame becomes an element in the principal frame, serving to partly support and brace some arms of said principal frame, and I will now describe it. It is built upon the base C. It comprises the bracket B', which is secured to said base at $b'$ and at $b^{10}$ and contains the lower bearing for the driving-shaft of the conveyer-rakes; the plank $B^2$, which is secured upon the bracket B' at the stubbleward end and is blocked up from the base C an equal distance at the grain end; the upright metal posts $B^3$ and $B^4$, which are secured at the lower ends to the plank $B^2$ by means of suitable angle-brackets $b^3$ and $b^4$, respectively, and the top sill or cap-plate $B^5$, which is made of steel-plate, having a flange turned down all round it to increase its stiffness, as well as for another purpose hereinafter explained, the said cap-plate being secured to the upper ends of the posts $B^3$ and $B^4$ by suitable angle-brackets $b^{30}$ and $b^{40}$, respectively.

Figure 4:
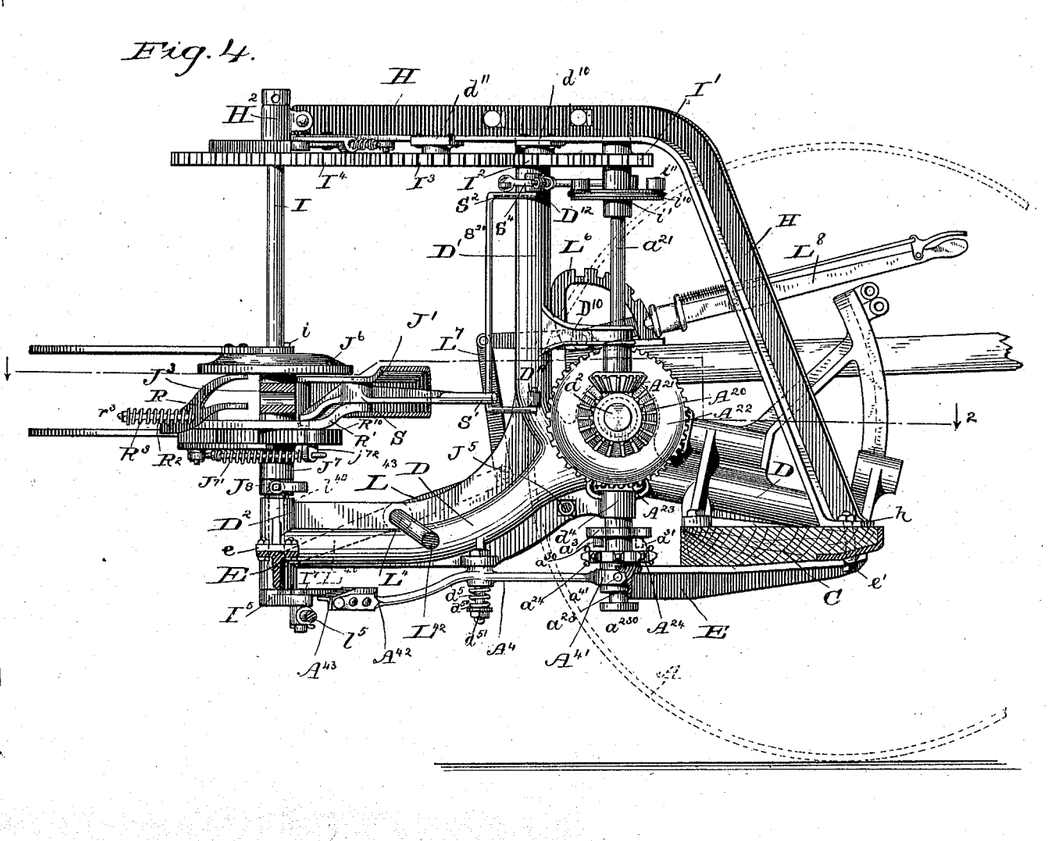
Fig. 4 is a section at the line 4 4 looking stubbleward, the breast-plate and considerable part of the knotter-frame and tying mechanism being cut away and removed to show more clearly the parts relating to the present invention.
Figure 5:
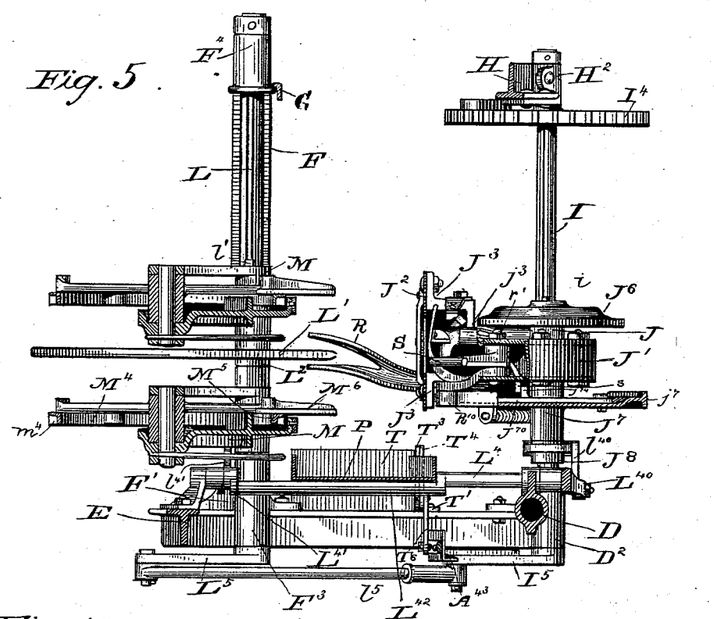
Fig. 5 is a sectional elevation, looking rearward, of the packing, binding, and tripping mechanism, section being made through the packer-shaft and binder-frame, as at the line 5 5 on Fig. 1.

The structure of the conveyer-frame in respect to other details will be further hereinafter explained in connection with the description of the conveying mechanism to which such details relate. Besides this upright conveyer-frame, the principal frame comprises other upright parts—viz., the upright arm D' of the bracket D, which proceeds from said bracket about midway between its forward and rear extremities, and the post F, which is secured to the bracket E at a point almost directly grainward from the rear end of the bracket D. To the upper end of the post F, the horizontal upper bar G is secured, and extends thence forward to the conveyer-frame, to whose top or cap plate $B^5$ it is made fast. This bar is an angle-iron, and at the forward end it is bent around the end of the cap-plate $B^5$ with its two flanges, which form the angle embracing the angle or corner formed by said plate and its flange, and is riveted to the plate in this position, whereby a very rigid junction is produced. The frame has another upper bar H. It is made fast at the forward end to the base C at the point $h$, and extends thence in a slanting direction upward, as seen in Fig. 4, to a point as high as the upper end of the upright arm D' of the bracket D, and is then bent horizontal and extended horizontally rearward, its rear end being directly above the rear end of the bracket D. In addition to these two upper bars G and H, the bracket G' is made fast to the top of the cap-plate $B^5$ of the conveyer at the rear edge thereof and projects rearwardly therefrom to afford a bearing for a vertical shaft of the packing mechanism, which will be hereinafter described. For convenience of reference, the four rearwardly-extending bars D, E, G, and H and the vertical posts D' and F, which uphold the upper bars, all which are rigid with the base C, may be referred to as the binder-frame, their primary purpose being to afford bearings for the shafts of the packing and binding mechanism.

I will now describe the trains of mechanism which are mounted on the frame-work described. At the grainward end of the main driving pinion-shaft $a^2$ there is made fast the beveled gear $A^{20}$ $A^{22}$. Meshing with the part $A^{20}$ is the beveled pinion $A^{21}$. The binder-frame bar H affords a bearing for the upper end of shaft $a^{21}$, and it has a further bearing in the bracket-like arm or projection $D^{10}$, which juts out horizontally from the upright arm D' of the bracket D. The rear end of the bracket D and the rear end of the bar H, which are vertically in line, are provided with shaft-bearings $D^2$ and $H^2$, respectively, in which the vertical knotter-driving shaft I is journaled. At the upper end of the shaft $a^{21}$ there is located the gear-wheel I', which is clutched to said shaft by mechanism hereinafter described, and on the horizontal portion of the bar H there are journaled the successive wheels $I^2$, $I^3$, and $I^4$ of the train, which derive motion through the wheel I', the last of which $I^4$ is fast upon the shaft I and communicates power thereto.

The upper bearing of the shaft $a^{21}$ and the bearing of the wheel $I^2$, which have been described as obtained on the bar H, are conveniently formed, the former directly on the extension $D^{100}$ at the upper end of the arm D', which is provided for the purpose of making secure the fastening of said arm D' to the bar H, and the latter on a small bracket $d^{10}$ on said bar H; but in effect the bearings are, as stated, obtained on the bar H, since both the bracket $d^{10}$ and the extension $D^{100}$, which contain them, are bolted fast to said bar; also, the bearing of the wheel $I^3$ is directly obtained upon a bracket $d^{11}$, which is secured to the bar H.

The knotter-frame has the sleeve J journaled on the vertical shaft I, and comprises, also, the hood J', which is made rigid with the sleeve J by being bolted to suitable lugs $j$, which project from the sleeve for that purpose, and the breast-plate $J^2$, which is bolted to the forwardly and grainwardly projecting end $J^{10}$ of the hood $J'$, and is further secured to the grainwardly-extended portion $J^3$ of the knotter-frame, which is the knotter-frame proper, in which at $j^3$ is journaled the knotter-bill, and which supports the other parts of the knotting mechanism, which need not be further described, since they constitute no part of this invention. The knotter-frame is kept in place angularly—that is, is prevented from angular displacement on the shaft I—by means of the rod $J^5$, which is secured by its lower and upper horizontal arms to the bracket D and to the frame-bar H, respectively. The vertically-extended portion $J^{50}$ between said arms is clasped by the loop or eye $j^2$, fastened upon the back side—i. e., the stubbleward side—of the breast-plate at the forward end, and adapted to slide up and down on the vertical portion $J^{50}$ of the rod $J^5$. The same rod $J^5$ serves as the rear fastening of the grain wall or guard $C^2$, which at the forward end is secured to the stubbleward finger $c'$ of the finger-bar, and extends thence rearward, constituting the stubbleward wall, which bounds the path of the grain into the binder. It is fastened to the upper part $J^{50}$ of the rod $J^5$ by the staple $c^{15}$, riveted to it and clasping the rod at a point higher than it is ever necessary to adjust the breast-plate, so that said fastening does not interfere with such adjustment. The rear end of the guard $C^2$ laps over the forward end of the breast-plate, the end of the breast-plate passing in behind—that is, stubbleward of the end of the guard—so that the grain passing from the conveyer to the binder meets no obstruction at that point. The shaft I is longitudinally grooved to receive the key $i$, by means of which the knotter drive-wheel $J^6$ and the trip and cam wheel $J^7$, the former located above and the latter below the sleeve J of the knotter-frame, are feathered to said shaft and caused to revolve therewith while being adapted to slide thereon.

The key $i$ is cut away at the middle part, so that the feather which it constitutes does not engage the sleeve $J'$, and it is also cut away near the lower end, so that the collar $J^8$, loose on the shaft I, is not driven by said shaft. Below the collar $J^8$ and above the knotter-wheel $J^6$ the key $i$ is headed, and thereby retains the wheel $J^6$, sleeve $J'$, wheel $J^7$, and collar $J^8$ in successive contact hub to hub on the shaft, so that the entire assemblage of parts recited may move together vertically—that is, longitudinally with respect to the shaft—as the necessity for such adjustment arises, the same being effected by mechanism hereinafter described.

The collar $J^8$ may be considered as part of the knotter-frame, since it serves to keep the wheels in their proper relation to the frame. As will hereinafter appear, it serves as the point of the connection with the knotter-frame of the mechanism which adjusts said frame and its wheels on the shaft.

The post F, which is a cast-iron post and is formed with the foot or flange $F'$ at the lower part, by which it is secured to the bracket E, and with the flange $F^2$, by which it is secured to the bar G at the top, has also in the vicinity of said flanges, respectively, the lower bearing $F^3$ and the upper bearing $F^4$ for the needle rock-shaft L, which is actuated by the link $l^5$, connected at one end to the crank-arm $I^5$, with which the shaft I is provided below its lower bearing, and at the other end to the crank-arm $L^5$, with which the needle rock-shaft L is provided below its lower bearing. The needle $L'$ is driven by the shaft L, its hub $L^2$ being feathered on said shaft and located between the hubs or collars $M^2$, which constitute the journal-bearings of two arms of the packer-frame, hereinafter described, which are also guided by means of their said bearings on said shaft. The shaft is longitudinally grooved similarly to the knotter-shaft, and a key $l$ in said groove is cut away at the end portions, excepting as to heads hereinafter specified, but at the middle protrudes as a feather engaging the hub of the needle, said key having at each end a head $l'$, between which heads are clasped the two hubs or collar $M^2$ of the two arms of the packer-frame, so that the key binds together said two arms and the intermediate needle-hub, and is by its heads at the same time retained in place while the packer-frame and needle are adjusted vertically on the shaft L, the needle at all positions being actuated by said shaft. The vertical adjustment of the knotter-frame and mechanism and the like vertical adjustment of the needle and packer-frame are effected by means of the rock-shaft $L^4$, which is journaled in suitable bearings provided on the brackets D and E, respectively, and has at one end the crank-arm $L^{40}$ and at the other end the crank-arm $L^{41}$, said crank-arms being connected by the links $l^{40}$ and $l^{41}$, respectively, the former to the collar $J^8$ and the latter to the hub or collar $M^2$ of the lower arm M of the packer-frame. The crank-arms $L^{40}$ and $L^{41}$ are equal and parallel, so that they give like movement to the parts which they respectively actuate as the shaft is rocked. Between the bearings of the rock-shaft it is cranked to form the offset portion $L^{42}$, which in all operative positions of the cranks $L^{40}$ and $L^{41}$ stands lower than the shaft-bearings and forward of their vertical plane. The cranks $L^{40}$ and $L^{41}$ project rearward of the shaft and the offset portion $L^{42}$, standing forward of the shaft, and the rocking of the shaft which lifts the cranks will lower the offset portion, or vice versa. The offset $L^{42}$ supports the binder-floor P, which is hinged to the sheathing $c^2$, by which the base C is covered, said sheathing projecting rearwardly to cover part of the driving mechanism, hereinafter described. The portion $L^{42}$ of the crank-shaft is located only a short distance rearward from the hinge $p$, so that comparatively slight change of position of $L^{42}$ caused by rocking the crank-shaft will effect considerable adjustment vertically of the rear end of the floor P, and by reason of the opposite movement of the cranks $L^{40}$ and $L^{41}$ and the offset portion $L^{42}$, this vertical adjustment of the floor will be in the opposite direction from the simultaneous adjustment of the binding and packing mechanisms. The rocking of the shaft $L^4$ is effected by means of the lever $L^8$, which is pivoted at the center of the notched segment $L^6$, and is connected by means of the link $L^7$ to the crank-arm $L^{43}$ of said rock-shaft. The lever $L^8$ is provided with familiar devices for locking it to the notched segment at any notch, and it extends upward to form a handle, which can be operated by the driver.

In addition to the train of mechanism which I have already described, which derives power through the part $A^{20}$ of the double beveled gear-wheel $A^{20}$ $A^{22}$, another train communicates power from the part $A^{22}$ of said wheel to the packers and conveying mechanism. This train comprises the pinion $A^{23}$, which is journaled in the bearing $d^4$ on the bracket D on the lower side of said bracket, and has clutched to its shaft $a^{23}$ a sprocket-wheel $A^{24}$, which drives the chain $a^{24}$, which passes thence around the sprocket-wheel $A^{25}$, which is journaled in a position grainward of the vertical plane of the path of the grain into the binder, the chain $A^{24}$, therefore, crossing said plane but underneath said path. The shaft-bearing of the wheel $A^{25}$ is obtained upon the arm $E^{10}$ of the bracket $E'$, upon the upper side of which arm the said wheel is located. This wheel has rigid with it the gear-wheel $A^{26}$ and the sprocket-wheel $A^{27}$. The former drives the packers and the latter drives the conveyer.

I will describe first the packer-driving train. The gear-wheel $A^{26}$ meshes with and drives the gear-wheel $A^{28}$, which is loose on the shaft $a^{28}$, but drives the shaft, as hereinafter described. This shaft has its lower bearing on the bracket-arm $E^{11}$ and extends upward above the wheel $A^{28}$, and at the upper end is journaled in the bracket $G'$, hereinabove mentioned, which is secured to the top of the conveyer-frame. The wheel $A^{28}$ drives the shaft $a^{28}$ by means of the spring-actuated pawls $a^5$ $a^5$, which are pivoted to the collar $a^6$, which is pinned fast on the shaft $a^{28}$, said pawls engaging the interiorly-serrated rim of the wheel $A^{28}$, and causing the wheel to drive the shaft when revolved in one direction, but permitting the shaft to be revolved in the same direction farther, or while the wheel is at rest, without hinderance on account of the presence and connection of said wheel, the pawls trailing over the serrated limb when the shaft is thus independently revolved. The purpose of this construction will hereinafter appear. This shaft $a^{28}$ communicates power to the packing mechanism which is journaled on the packer-frame, which will now be described. This frame consists of two horizontal bracket-arms M M. Each of the bracket-arms M M has at its rear end a journal-box $M^2$, hereinabove mentioned, by which it is adapted to slide on the needle rock-shaft L, the needle $L^2$ being located on the shaft between said journal-boxes, as stated. At the forward end of the bracket-arms M M each of said brackets has a two-part box $M^3$, which incloses the hub $m^7$ of the pinion $M^7$, said hub having the flange $m^{7o}$ at the lower end to retain the pinion in the box. These pinions are both feathered on the shaft $a^{28}$, the key $m^{71}$, serving as the feather, sliding in the longitudinal groove $a^{280}$ in the shaft and retained in the pinion by its heads $m^{74}$. Between the pinions $M^7$ there is placed on the shaft $a^{28}$ the sleeve $M'$, which abuts against the hubs of the pinions and keeps them a proper distance apart. On each of the bracket-arms M M there is journaled a packer-wheel $M^4$, having a gear-rim $m^4$, meshing with and causing the wheel to be driven out of the pinions $M^7$. Each of said bracket-arms has also integral or otherwise rigid with it a cam $M^5$ for tripping the packer-teeth $M^6$. The action of this cam and packer-teeth in connection therewith is not a part of this invention, and need not be herein particularly described. For a further understanding thereof, reference is made to patent to L. W. Noyes, No. 366,502, dated July 12, 1887.

It will be seen that the entire packer-frame, hereinabove described, is guided and adjustable on the two vertical shafts L and $a^{28}$, and that in such adjustment the packer-driving pinions $M^7$ are carried with the packer-wheels with which they mesh respectively, being in all positions on the driving-shaft $a^{28}$ driven by their feathered connection therewith; also, it will be seen that this vertical adjustment is effected simultaneously with and by the same mechanism which effects the like vertical adjustment of the knotter-frame and binding arm or needle.

The conveying mechanism consists of the butt-carrying fingers $U^2$ and their drive-chains $u^2$, and the head-carrying rakes, comprising the shaft $U'$ and the fingers $U^{10}$, the chains $u'$ $u'$, which carry said rakes, and the wheels which drive and carry said chains, respectively, and their several shafts and bearings, which will now be described in detail.

In the same horizontal plane with the sprocket-wheel $A^{27}$, which receives power as hereinabove described, but located considerably forward of said sprocket-wheel, is the sprocket-wheel V. It is journaled upon the stud $v'$, which is made fast to the base C. Preferably and most conveniently the base C is a plank, and the stud $v'$ is formed upon a plate $v^{10}$, which is bolted or screwed fast on the under side of the plank, the stud $v'$ projecting up through the plank to receive the sprocket-wheel V. The chain $u^2$ passes around the sprocket-wheels $A^{27}$ and V, and also around a suitable wheel $a^{27}$ at the grain end of the conveyer. The butt-carrying fingers $U^2$ are angle-shaped, with a horizontal and a vertical lip, the angle standing open in the direction of advance of the fingers. They are pivoted to links of the chain $u^2$, and have each a backwardly-projecting tail $U^{20}$ above the plane of the chain and provided with upwardly-projecting abutments $u^{20}$, which control the fingers, causing them to project forward or permitting them to fall back along the chain, as further explained. Integral with the bracket B′ is the downwardly-open cam $B^{10}$, which overhangs the track of the abutments $u^{20}$. It extends from a point some distance grainward of the bearing of the sprocket-wheel V, stubbleward and rearward partly around said bearing overhanging the sprocket-wheel and extending rearward almost to the sprocket-wheel $A^{27}$. From the grainward end of this cam to the vicinity of the wheel $a^{27}$ there extends the rail $B^6$, whose forward face at the stubbleward end coincides with the rear lip of the cam $B^{10}$ and constitutes a continuation thereof. This rail $B^6$ is secured to the under side of the plank $B^2$, which is secured upon the plank C, as described, the front edge of the rail $B^6$ being the guide-track of the chain $u^2$. The rail $B^6$ and the cam-track $B^{10}$, engaging with the abutments $u^{20}$ on the tails $U^{20}$ of the butt-carrying fingers, keep the fingers projecting substantially at right angles to the course of the chain while the chain is passing stubbleward in front of the conveyer and rearward around the sprocket-wheel V, and farther rearward until the abutments pass beyond the cam $B^{10}$, and since the cam terminates only just before reaching the sprocket-wheel $A^{27}$, the butt-carrying fingers remain projecting and operative upon the grain to that point, and at that point, being released from the control of the cam, they are free to yield backward from the grain which they have hitherto been forcing forward, and to withdraw lengthwise grainward out of the grain (which is at that point within reach of the packers) as the chain carries them around the sprocket-wheel $A^{27}$.

Figure 3:
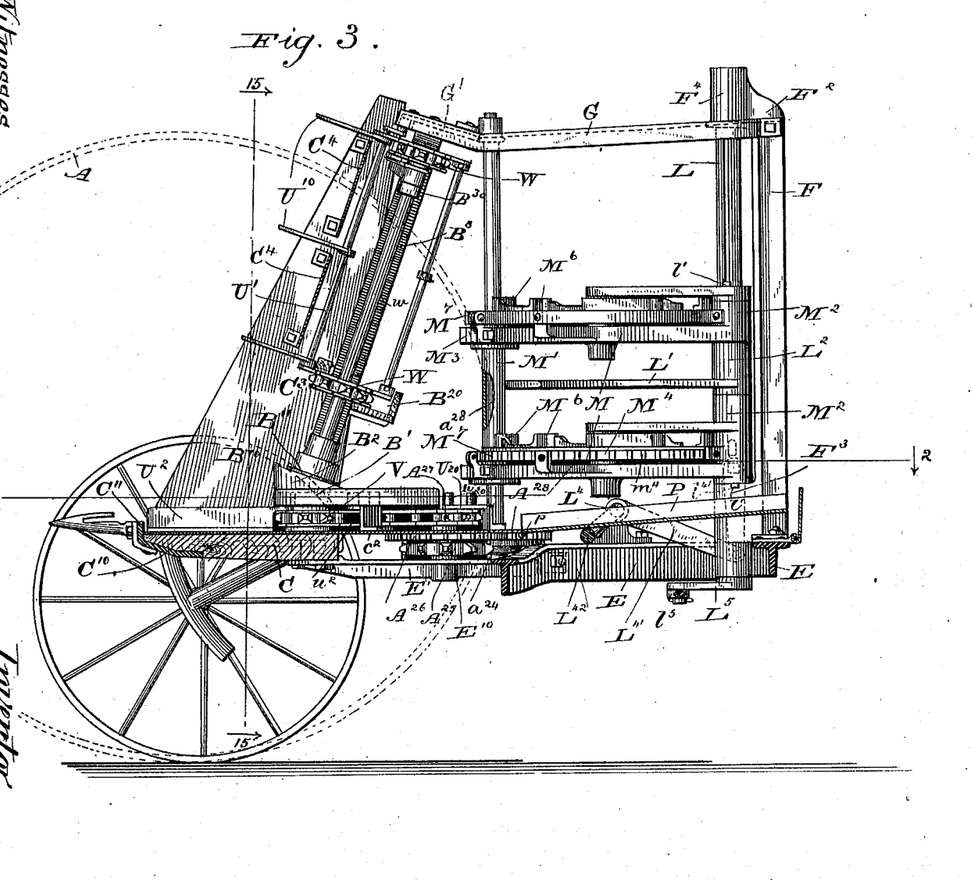
Fig. 3 is a section at the line 3 3 on Fig. 1 looking grainward.

The head-carrying rake-shafts U′ are connected to corresponding links of the two chains $u'$, which are driven by the sprocket-wheels W W, which are fast on the shaft $w$. This shaft is journaled at the lower end in the boss $B^{11}$, which projects obliquely upward, leaning rearward from the bracket B′, and at the upper end in a suitable bearing provided on the bracket $B^{30}$, which is secured to the post $B^3$. At the grain end of the chains $u'$ they pass around suitable sprocket-wheels W′, journaled on brackets provided on the post $B^4$. To the base C grainward beyond the entire course of the conveying-chains—i. e., at the extreme grainward end of said base—there is secured the divider $C^3$. To this divider the ends of the stripping-plates $C^4$ are fastened, as seen in Fig. 3, said plates extending stubbleward between the teeth of the head-carrying fingers, and at the end of the conveyer said stripping-plates are bent around the shaft $w$ outside the path of the rake-shafts and their ends secured to the bar $C^{40}$, which is fastened at the upper end to the cap-plate $B^5$ and at the lower end to the rear edge of the plank $B^2$. To the brackets $b^{30}$ and $b^{40}$ there is secured the rail $C^5$, which furnishes a track for the controlling-tail $U^{11}$ of the head-carrying rakes, causing the fingers to be protruded forward during the grainward movement of the rakes. The rakes are relieved from the control of this guard when they reach the vicinity of the sprocket-wheels W, and at that point are free to yield to the grain which they have hitherto been carrying, and to withdraw from it lengthwise as they pass around the sprocket-wheels and return grainward. In order to insure that they shall thus withdraw at least by the time that they have gotten around the sprocket-wheels, there is secured to the frame-posts $B^3$ and $B^4$ on the rear side thereof the channel-bar $B^{20}$, whose rear upstanding lip will be encountered by teeth $U^{10}$ when the rakes commence to move stubbleward after passing around the sprocket-wheels. Power is communicated to the shaft W by means of the star-shaped coupling $W^2$, whose lower end rests in the star-shaped socket $V^4$, formed in the hub of the sprocket-wheel V and open upwardly, and whose upper end enters the similarly-shaped socket $w^4$ in the collar or hub $W^4$, which constitutes the lower terminal and bearing portion of the shaft $w$. This coupling fits loosely in the sockets, respectively, and said sockets are enlarged at the top and bottom, as illustrated, being narrowed at the middle point, so that the coupling has capacity for lateral rocking movement in the direction of both the flanges of which it is constituted, whereby it is adapted to communicate the rotary movement from the sprocket-wheel V, which has a vertical axis, to the shafts W, revolving on an oblique axis.

The finger-bar $C^{10}$ of this machine is in effect a metal armor for the front edge of the base C, which extends underneath the front edge of said base, which is preferably beveled off on the under side at that edge so that it will present the least possible obstruction to the grain below the plane of the sickle. The finger-bar is bent up in front of the forward edge of the base, and projects upward above the upper surface thereof a short distance, which may vary from half an inch to an inch or somewhat more, thus forming a lip $C^{11}$ at the forward edge of the base. The purpose of this lip is to prevent the grain which has once been severed by the sickle and lodged on the base C from slipping forward off of it as it is carried stubbleward, as it would be liable to do without a guard. I do not limit myself to forming this lip by means of the finger-bar; for it may be otherwise provided. The grain wall or guard $C^2$, which guides and determines somewhat the course of the grain as it passes around the delivery end of the conveyer, extends down to and crosses the lip $C^{11}$. In some conditions of grain, especially where it is very thin, the quantity delivered against the conveyer and lodged on the base C is not sufficient to stand together or to remain standing when it is carried stubbleward, and especially when it is carried around the end of the conveyer; but, on the contrary, it has a strong tendency to fall prostrate, heads foremost—i. e., with the heads in the direction of advance. This would cause it to enter the binder in a condition in which the binder would be incapable of compacting it into a bundle or binding it, and to overcome this difficulty I provide the leaves $C^5$, which are made of flat and quite thin sheet metal having great elasticity and flexibility, and which I place in a position leaning breadthwise rearward and projecting their length across the path of the grain into the binder at the delivery end of the conveyer. I have used two such leaves, each three or four inches wide and located one above another in the same rearwardly-inclined plane and a short distance apart, (say from half an inch to an inch,) so that they constitute a trip or leaning fence across the path of the grain from seven to eight inches high. I secure them, preferably, at the stubbleward end, and I have found it convenient to fasten them to the guard $C^2$. They are thus adapted to yield rearward very easily at their grainward ends nearest the conveyer, and I prefer to have them so flexible that they will not only yield directly rearward, but will also yield by torsion as they are pressed upon by the grain in front. These leaves $C^5$ have the following effect: When the grain is in the condition described, so thin and light that it tends to fall prostrate before reaching the binder, the heads of the straws meeting these upwardly-inclined leaves, and being pushed by the engagement of the butt-carrying fingers at the butt ends, slide up the incline and are brought to an approximately upright position and detained in front of the leaves until a sufficient quantity is thus accumulated to overcome the resistance which the leaves offer, or until the quantity is sufficient to cause the leaves to yield or to cause the grain to slide up the inclined plane formed by the blades and escape past them, which it will do in a sufficiently upright position to be properly engaged by the packers and compacted into a bundle. It will be noticed that by the construction described the butt-carrying fingers continue to engage the grain for a considerable distance after the head-carrying rakes have ceased to operate upon it and have withdrawn grainward the chain $u^2$, which carries the butt-carrying fingers, being conducted around the sprocket-wheel $A^{27}$, which is located a considerable distance rearward from the sprocket-wheel V, whereas the head-carrying chains pass directly around their driving sprocket-wheels at the end of the conveyer without being conducted any farther distance rearward. The purpose and effect of this construction is that the butts are actuated longer than the heads, and the grain is thereby straightened up before it reaches the binder.

This machine is so constructed, as will hereinafter appear, that the conveying and packing mechanism operate in the intervals of the action of the binder-arm and knotter, said binder-arm and knotter standing at rest while the conveyers and packers operate, the conveyer and packers standing at rest while the binder-arm and knotter operates. It will thus occur that straw which is fed by the packers within reach of the binder-arm will be still standing between consecutive packer-teeth when the packers come to rest and the binder-arm begins its movement. Such straws, being within the sweep of the binder-arm and engaged by it to be gathered into the bundle, would be very liable to be torn in two, or, if their quantity was sufficient to prevent that, would be liable to choke the binder mechanism and bring it to rest if the packer-teeth forward of which such straws were standing could not yield to permit the straw to be gathered by the needle and carried rearward into the bundle. To render possible such yielding is the purpose of the pawl-connection of the shaft $a^{28}$ to the gear-wheel $A^{28}$, which drives it. When the packing mechanism comes to rest and the binder-arm in encircling the bundle engages straws which are in position to be held by the packer-teeth, as above described, the packer-wheels will be revolved a short distance, revolving also their immediately actuating-pinions on the shaft $a^{28}$ and revolving said shaft sufficiently to permit the straw engaged to pass rearward with the binder-arm into the bundle, the wheel $A^{28}$ in this action standing still and the pawls trailing over the serrated interior rim of the wheel.

I will now describe the mechanism by which the binding mechanism is tripped into and out of action or engaged and disengaged from the driving-power alternately with the conveying and packing mechanism.

R is the compressor. It is pivoted to the lever $R'$ at $r$, and is further connected to said lever by the link $R^2$ and the spring $R^3$ coiled thereon, the link being pivotally connected to the lever and passing through an eye $r^2$ in the web of the compressor, the spring being on the link outside of said eye and stopped by the nut $r^3$, which is screwed onto the end of the link, and by which the tension of the spring may be varied at will to regulate the compactness and size of the bundle. The lever $R'$ is pivoted at $r'$ to the hood $J'$, forming part of the knotter-frame, and swings horizontally in a plane above that of the trip-wheel $J^7$, and has a downwardly-projecting abutment $R^{10}$ standing in the path of said wheel. The wheel $J^7$ has the upwardly-projecting flange $j^7$, which constitutes a cam-track, which engages the abutment $R^{10}$ as the wheel revolves. To the upper side of the trip-wheel $J^7$ there is pivoted the trip $J^{70}$, which has the peripheral flange $j^{70}$, constituting a continuation and completion of the cam-track formed by the flange $j^7$ on the wheel $J^7$. The position of the pivot of the trip $J^{70}$ on the wheel $J^7$ relatively to the pivot $r'$ of the lever R when the wheel is in the position of rest is such that the pressure exerted by the abutment $R^{10}$ against the portion $j^{70}$ when the bundle presses against the compressor R tends to force the trip $J^{70}$ toward the shaft I until it is stopped by contact with the hub of the wheel $J^7$. The construction and action of the tripping mechanism thus far described is substantially the same as that shown in patent to L. W. Noyes, No. 366,240, dated July 12, 1887.

The movement of the trip, which may be caused as above described, is resisted elastically by the spring $J^{71}$, which is coiled around the guide-stem $j^{71}$, which is fastened at one end to the under side of the wheel $J^7$, and at the other end projects through an eye in the lug $j^{72}$, which projects downward from the trip $J^{70}$ through an opening in the wheel $J^7$, the spring $J^{71}$ being stopped between said lug and a stop and adjusting-nut $j^{73}$ screwed onto the guide-stem $j^{71}$. The tension of the spring $J^{71}$ may be adjusted by means of the nut $j^{73}$ to correspond with that of the spring $R^3$, to make the bundles of such size and compactness as desired. The trip $J^{70}$ has the upwardly-projecting finger $J^{74}$, which in the position of rest shown in Fig. 2 engages the downwardly-projecting finger $s$ on the lever S and locks said lever against turning on its pivot. The lever S is pivoted on the same bolt $r'$ which forms the pivot of the lever $R'$. From said pivot it extends forward behind—that is to say, stubbleward of—the breast-plate ending in the finger $S'$. This finger, constituting the forward end of the lever S, rests against a vertical offsetting portion $S^{20}$ of the crank-shaft $S^2$. This shaft is journaled in two lugs $D^{11}$ and $D^{12}$, jutting off from the vertical arm $D'$ of the bracket D. Above the upper bearing $D^{12}$ there is pivoted on the shaft $S^2$ a lever $S^3$ $S^4$, and said lug $D^{12}$ has a stop-shoulder $d^{12}$ projecting upwardly to limit the movement of the lever on the pivot in the direction in which its movement is also resisted by the spring $S^5$, which is coiled around the link $s^4$, which is connected to the end of the lever-arm $S^4$ and extends through an eye in the lug $d^{13}$, which projects from the arm $D'$, the spring $S^5$ being stopped between said lug and the end of the lever, and a check-nut $s^5$ being screwed onto the end of the link beyond the lug to limit the reaction of the spring. To the upper end of the shaft $S^2$ above the lever $S^3$ $S^4$ there is made fast the lever-arm $S^6$. This lever-arm bends downward at its end and has an eye through which passes the link $S^7$, which is connected at one end to the arm $S^3$ of the lever $S^3$ $S^4$, and beyond the lever-arm $S^6$, around said link, there is coiled the spring $S^8$, which reacts between the end of the lever-arm $S^6$ and a stop-nut $s^8$, which is screwed onto the end of the link.

Figures 6, 7:
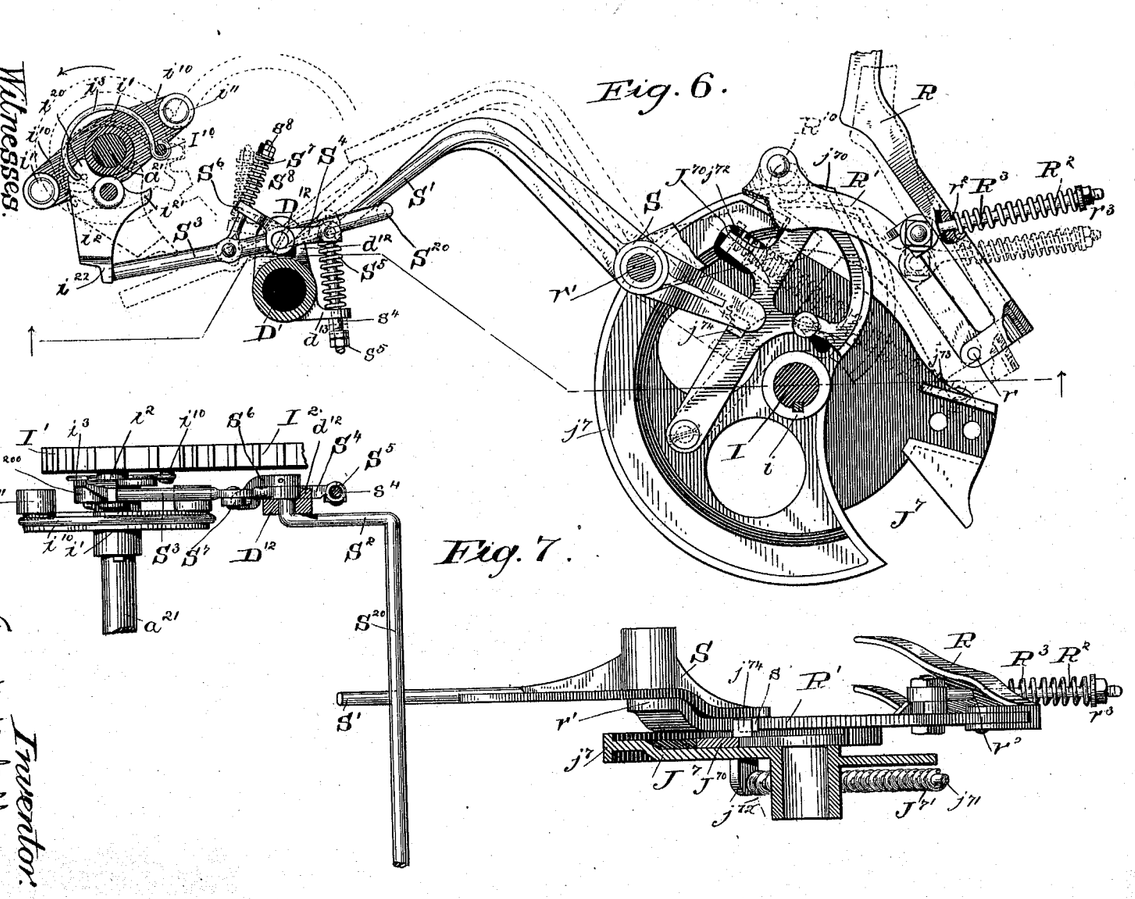

The gear-wheel $I'$, at the upper end of the shaft $a^{21}$, is loose on said shaft, as stated. Below it, keyed fast to the shaft, there is a clutch-head $i'$, comprising a hub and two oppositely-extended horizontal lever-arms $i^{10}$, which constitute a cross-head, and which carry at their extremities, respectively, each an upwardly-projecting abutment, preferably a stud having an anti-friction roll $i^{11}$. To the gear-wheel $I'$ on the under side there is pivoted the clutch-dog $i^2$, its pivot being parallel to the axis of the shaft $a^{21}$ and a little distance removed from the hub of the wheel. This clutch-dog has two projecting shoulders $i^{20}$ and $i^{21}$, which may collide with the hub of the wheel, one of said shoulders colliding therewith when the dog is rocked in one direction on its pivot and the other when it is rocked in the opposite direction. From one of these shoulders $i^{20}$ the abutment $i^{200}$ projects downward into the horizontal plane of the abutments $i^{11}$ of the clutch-head. The dog has also the finger or lever-arm $i^{22}$, which projects away from the axis of the wheel $I'$ in the plane of the end of the lever-arm $S^3$, and is adapted to collide therewith in certain positions of said lever-arm. A spring $i^3$ is fastened at one end to the gear-wheel $I'$ upon the stud $I^{10}$, which projects downward from the lower side of the gear, and the other end of the spring is connected to the dog $i^2$, and the spring tends to force the shoulder $i^{20}$ of the dog away from the hub of the wheel, and thereby to rock the dog on its pivot into the position shown in dotted line in Fig. 6, wherein the shoulder $i^{21}$ rests against the hub, and the abutment $i^{200}$ stands in the path of rotation of the abutments $i^{11}$ of the clutch-head. The operation of this tripping mechanism can now be understood to be as follows:

When the pressure of the grain against the compressor has caused the lever $R'$ to turn on its pivot $r'$ and to move the trip $J^{70}$ toward the shaft I, as described, thereby disengaging the finger $j^{74}$ from the finger $s$ on the lever S, the springs $S^5$ and $S^8$, the latter reacting directly against the lever-arm $S^6$ and the former indirectly through the lever $S^3$ $S^4$ and the link $S^8$ cause the rock-shaft $S^2$ to turn in its bearings and the offset portion $S^{20}$ of said shaft to press grainward against the finger $S'$ of the lever S, and to rock said lever on its pivot into the dotted position shown in Fig. 6, the several lever-arms $S^3$, $S^4$, $S^6$, and $S^{20}$, reaching at the same time the extreme dotted position shown in Fig. 6. This movement of the lever $S^3$ $S^4$ disengages the arm $S^3$ thereof from the finger $i^{22}$ of the dog $i^2$, and said dog is thus permitted to yield to the action of the spring $i^3$, which throws it over in the position shown in dotted line in Fig. 6. As stated above, when the dog is in this position its abutment $i^{200}$ is in the path of rotation of the abutments $i^{11}$ on the clutch-head, and said clutch-head being continuously revolving one of said abutments now collides with the dog, and the wheel $I'$ is thereby clutched to the shaft $a^{21}$, and revolved therewith through the medium of the abutments on the dog and clutch-head, respectively, thus communicating motion to the binder-shaft I and wheels thereon through the wheels $I^2$, $I^3$, and $I^4$. One revolution of this shaft and its wheel completes the knotting operation, and as it nears the completion of its revolution the trip-wheel $J^7$, carrying the trip $J^{70}$, brings the finger $j^{74}$ of the latter around into collision with the finger $s$ of the lever S, and as the rotary motion of the wheel $J^7$ continues after this collision, the lever S being rocked on its pivot back toward its initial position, (shown in full lines in Fig. 6,) by means of its forward fin- S′ engaging the offset $S^{20}$, rocks the shaft $S^2$ and thereby moves the lever-arm $S^6$, and through the medium of the spring $S^8$ and link $S^7$ moves also the lever $S^3$ $S^4$ toward their positions shown in full lines. The lever $S^3$ $S^4$ reaches its initial position and the limit of its motion in that direction, and is stopped against the shoulder $d^{12}$ by the time the rock-shaft $S^2$ has been rocked so far as to bring the offset portion $S^{20}$ and the lever-arm $S^6$ to the intermediate dotted position shown in Fig. 6. In this position the lever-arm $S^3$ stands in the path of rotation of the finger $i^{22}$ of the dog, and the movement is so timed that this position is reached just in time to engage and arrest the dog. The wheel I′, however, will continue to revolve while the dog is rocking over its pivot on the wheel, and during this further movement, the wheel $J^7$ also continuing its revolution, the finger $j^{74}$ moves the lever S, the rock-shaft $S^2$, and its lever-arms to their initial line positions, respectively shown in full lines in Fig. 6, this additional movement compressing the spring $S^8$ after the spring $S^5$ has ceased to be compressed. The purpose of this elastic connection between the lever S and the levers $S^3$ $S^4$ is to prevent the necessity for the lever-arm $S^3$ moving back and forth against the finger $i^{22}$ of the dog, as it would be obliged to do if the elastic connection were dispensed with, and to provide for the backward movement of the dog $i^2$ as the pinion I′ revolves until the abutment $i^{20}$ is out of the path of the abutments $i^{11}$, thus making the stoppage of the binder simultaneous with the return of the trip-hook $J^{70}$ to its initial position; or, in other words, the spring-connection is for the purpose of allowing for the lost motion consequent to the peculiar action of the dog.

The rock-shaft $S^2$ is cranked close to its bearings, as is shown, to produce the offset portion $S^{20}$ and to render that portion of considerable length, as shown, in order that the action above described produced by the engagement of the lever S with said offset portion may be not prevented by the change of position of the lever S as the binding mechanism is adjusted vertically.

The disengagement of the conveying and packing mechanism from the driving-train is effected automatically when the binder is tripped into action by the following mechanism: To the shaft $a^{23}$ below the bearing $d^4$ there is made fast the clutch-head $a^3$, which has two abutments $a^{30}$ diametrically opposite projecting downward and adapted to engage the sprocket-wheel $A^{24}$, which for the purpose of permitting such engagement has the tooth $a^{31}$ projecting upward from its upper face. The sprocket-wheel $A^{24}$ has its hub provided with an annular groove $a^{240}$ and the lower end of the shaft $a^{23}$ has the stop-collar $a^{230}$ made fast to it. The sprocket-wheel $a^{24}$ is adapted to slide freely on the shaft $a^{23}$ between the stop-collar $a^{230}$ and the clutch-head $a^3$. $A^4$ is a lever, which is pivoted upon the stud $d^5$, which projects downward from the bracket D. A spring $d^{50}$ is coiled around the stud $d^5$ below the lever $A^4$ and stopped by the stop-nut $d^{51}$, screwed onto the lower end of the stud $d^5$. The lever $A^4$ is not designed to rock about the axis of its pivot-stud $d^5$, but, on the contrary, to rock in a vertical plane about an axis transverse to the axis of said stud, and the hub $A^{40}$, through which the stud $d^5$ passes, has the aperture for said stud at its central point of such size as to admit the stud, and from said point widening upward and downward in the direction of the plane of the rocking movement of the lever, as hereinafter described, thus in effect having the upper end of the spring $d^{50}$ as its fulcrum. At the forward end the lever $A^4$ is forked, the forks $A^{41}$ being provided with pins $a^{41}$, entering the groove $a^{240}$ in said hub. At the rear end of the lever $A^4$ there is secured the cam having two tracks $A^{42}$ and $A^{43}$ inclined in a vertical plane tangent or approximately tangent to a circle about the axis of the shaft I. At the lower end of said shaft below its bearing $D^2$ there is secured the lever-arm $I^7$, which projects out horizontally and at its end has the anti-friction roll $i^7$. The cam-tracks $A^{42}$ and $A^{43}$ slope the one upward and the other downward in the direction of rotation of the lever-arm $I^7$, the upper face of the former and the lower face of the latter being toward the plane of the path of the roll $i^7$.

Figure 8:
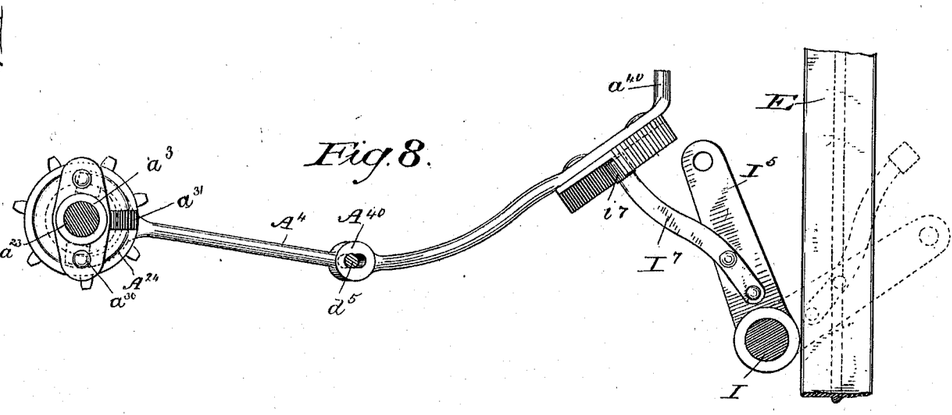
Figure 9:
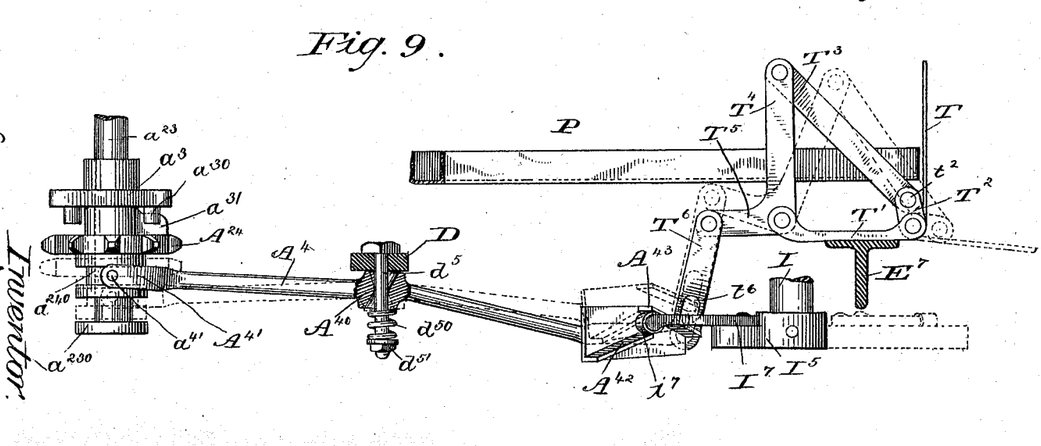
Fig. 9 is a sectional side elevation, of certain other parts of the tripping mechanism and the connections of the same with the end gate.
Figures 10, 11, 12, 13, 14:
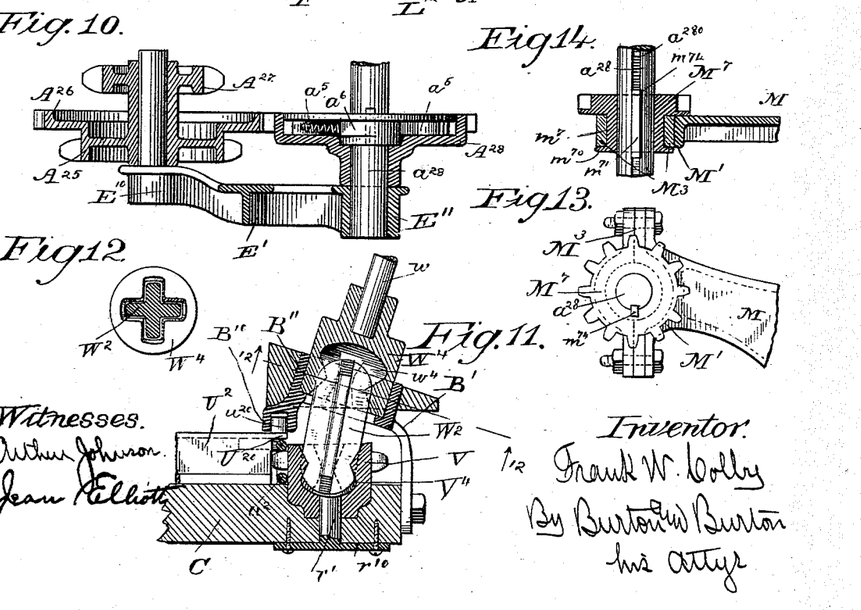
Fig. 10 is a section at the line 10 10 on Fig. 2.
Fig. 11 is an axial section through the conveyer-driving shaft and a universal joint by which it is connected to the sprocket-wheel from which it derives motion, section being made from front to rear.
Fig. 12 is a section at the line 12 12 on Fig. 11.
Fig. 13 is a detail plan of one of the packer-driving pinions and its bearing.
Fig. 14 is an axial section through the same showing the shaft in elevation.
Figure 15:
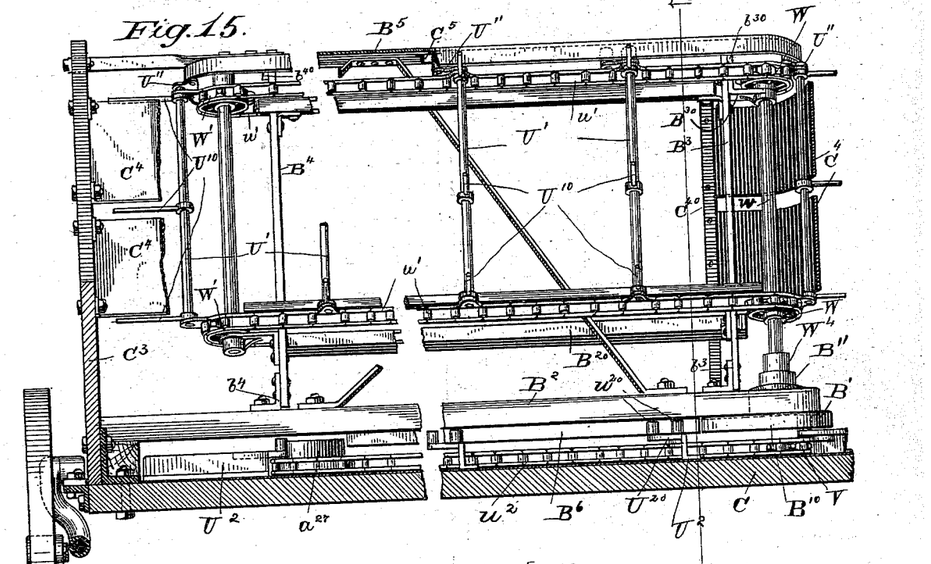
Fig. 15 is a sectional front elevation of the conveyer mechanism, section being taken at line 15 15 on Fig. 3.
Figure 16:
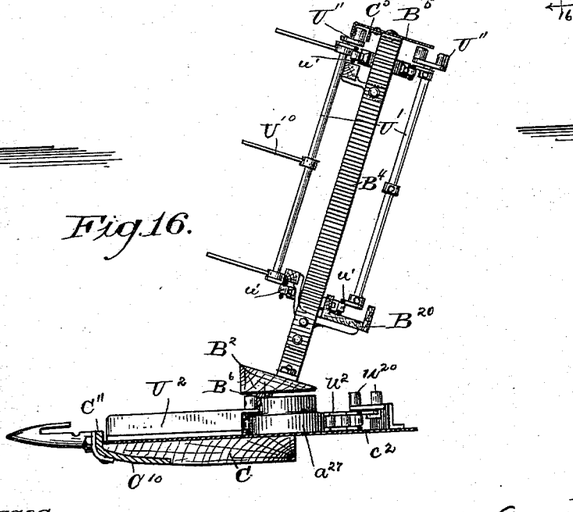
Fig. 16 is a sectional elevation of the stubbleward end of the conveyer looking grainward, section wherever indicated being made at the line 16 16 on Fig. 15.
Figure 17:
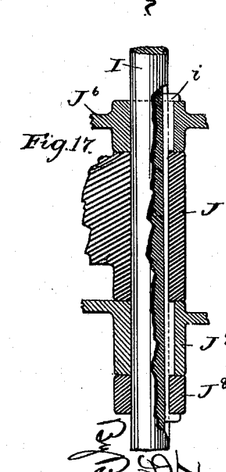
Fig. 17 is a detail section of the bearings of the binder-shaft, said shaft being shown therein partly broken away to show a key therein.

When the binder is at rest and the conveying mechanism is in operation—that is to say, when the clutch-head $a^{23}$ is engaged with and driving the sprocket-wheel $A^{24}$, as shown in Fig. 9—the cam-roll $i^7$ is engaged underneath the upper end of the cam-track $A^{43}$. As soon as the binder starts, the rotation of the lever-arm $I^7$ causes the roll $i^7$, acting against the inclined face of the cam $A^{43}$, to force the latter upward, thereby rocking the lever $A^4$ about its pivot and carrying downward the sprocket-wheel $A^{24}$ until it is out of engagement with the clutch-head $A^3$, thus disconnecting the conveying mechanism from the driving-power and leaving the cams $A^{42}$ and $A^{43}$ in the dotted position shown in Fig. 9. As the binder-shaft I nears the completion of its revolution, the cam-roll $i^7$, coming round to the vicinity of the cam $A^{42}$, passes above the lower end of said cam, and as it advances onto it, forces it downward, rocking upward the other end of the lever $A^4$ and bringing the sprocket-wheel $A^{24}$ again into engagement with the clutch-head $a^3$, thereby bringing the conveying mechanism into action at the last instant of the action of the binding mechanism. The necessity for the yielding fulcrum afforded by the spring $d^{50}$ and the purpose which it serves will be apparent when it is considered that it may happen that when the sprocket-wheel $A^{24}$ is pushed upward by the action above described, its tooth $a^{31}$ might collide endwise with either of the abutments $a^{30}$ on the clutch-head $a^3$, instead of passing up in front of one of them and being engaged thereby. If this should happen, the spring $d^{50}$ will yield and prevent the wrenching or breaking of the parts, and when an instant later the revolution of the clutch-head $a^3$ carries the abutment $a^{30}$ off from the tooth $a^{31}$ the reaction of the spring $d^{50}$ will force the lever $A^4$, and by means of it the wheel $A^{24}$ up into position to be engaged and driven by the clutch-head $a^3$. The arm $I^7$ is most conveniently connected to the shaft I by being fastened to the lever-arm $I^5$, as shown in Figs. 8 and 9. It is to be considered, however, an arm of the shaft I, as above described.

T is the end-gate of the binder. It is hinged upon the upper edge of the cross-arm $E^7$ of the bracket E. This end-gate requires to be let down to allow the bundle to be discharged after the binding is completed, and this is accomplished automatically by the following mechanism: The clip $T^2$, which forms one member of the hinge of the gate T to the binder-frame, and which is made fast to said gate, has pivoted to it at $t^2$ the link $T^3$. To the forward end of the clip T′, which forms the other member of the hinge and is fastened upon the bracket E, there is pivoted the bell-crank lever $T^4$ $T^5$, and to the upper end of the arm $T^4$ of said lever the link $T^3$ is connected. To the front end of the arm $T^5$ there is connected the link $T^6$, which depends from said connection, its lower end having the slot $t^6$, into which the end $a^{40}$ of the lever $A^4$ projects. The position of the end-gate and its operating link and levers back to the link $T^6$ while the binder is at rest and during the first part of its action is the same as shown in Fig. 9 in full lines.

When the binder apparatus and the arm $I^7$ revolve and lift upward the rear end of the lever $A^4$, the terminal $a^{40}$ of that lever first slides the length of the slot $t^6$ in the link $T^6$, and at the last part of the upward movement, having reached the end of the slot, pushes the link $T^6$ upward, and rocks the bell-crank lever $T^4$ $T^5$ over into the position shown in dotted lines, and thereby drops the gate T down to the dotted position, where it is out of the way of the ejected bundle. When the binder approaches the close of its action, the arm $I^7$ engages the cam $A^{42}$ and causes the contrary movement of the lever $A^4$, produces a contrary movement of all the links and levers connected with the gate, and lifts the latter again to its upright position.

I claim—

1. In combination with the binder-frame, arms fixed with respect to the principal frame located on opposite sides of the path of the grain into the binder, the needle rock-shaft and the knotter-driving shaft journaled in said arms, respectively, the needle and the knotter-wheel located and adapted to slide on and be revolved by said shafts, respectively, and the packer-frame guided and adapted to slide longitudinally on the needle rock-shaft, substantially as set forth.

2. In combination with the binder-frame, arms fixed with respect to the remainder of the principal frame and located on opposite sides of the path of the grain into the binder, the needle rock-shaft and the knotter-driving shaft journaled in said arms, respectively, the needle and the knotter-wheel located and adapted to slide on and to be revolved by said shafts, respectively, the shaft $a^{28}$, parallel to the needle rock-shaft, and the packer-frame having journaled on it a packer-wheel and its driving-pinion, said pinion being feathered on the shaft $a^{28}$, and the packer-frame being guided and adapted to slide on the needle rock-shaft, substantially as set forth.

3. In combination with the vertical needle rock-shaft and knotter-driving shaft, also vertical, said shafts being located on opposite sides of the path of the grain through the binder, the needle and the knotter-wheel located and adapted to slide on said shafts, respectively, and collars on said shafts, respectively, whereby the needle and the knotter-wheel may be moved longitudinally thereon, and a rock-shaft located below the path of the grain through the binder and extending transversely to the vertical plane of said path, and having a lever-arm on each side of said plane, said lever-arms being connected to the collars on said shafts, respectively, whereby the needle and the knotter-wheel may be simultaneously adjusted on their respective shafts, substantially as set forth.

4. In combination with the knotter-driving shaft, the knotter-frame guided thereon, and the knotter-driving wheel located and adapted to slide thereon and be revolved thereby, a lever-arm having its fulcrum on the binder-frame and connected to the knotter-frame to move it longitudinally on the shaft, the key which feathers the knotter-wheel on the shaft being provided with a head at each end by which it clasps the knotter-frame and wheels together, whereby the knotter-frame carries the wheels with it in its adjustment on the shaft, substantially as set forth.

5. In combination with the needle rock-shaft and its fixed bearings on the binder-frame, the packer-frame having two journal-bearings on the needle rock-shaft and a lever fulcrumed on the binder-frame and connected to the packer-frame to adjust it longitudinally on the needle rock-shaft, the needle being feathered on the shaft between the two bearings of the packer-frame thereon, whereby the packer-frame in its adjustment carries the needle, substantially as set forth.

6. In a binder in which the grain is bound standing on end, in combination with the needle and with the knotter having vertical shafts on opposite sides of the path of the grain through the binder, the binder-floor located between the axes of said shafts and adapted to oscillate vertically the rock-shaft $L^4$, having the two crank-arms and connections for them, respectively, to adjust the needle and the knotter, and having an oppositely-cranked or offset portion $L^{42}$, which upholds the binder-floor, whereby the rocking of the shaft adjusts oppositely the said floor on one hand and the binder mechanism on the other, substantially as set forth.

7. In a binder in which the grain is bound standing on end, in combination with the binder-frame, the vertical needle rock-shaft and knotter-driving shaft journaled in the frame on opposite sides of the path of the grain through the binder, the needle and the knotter-wheel adapted to slide on and be actuated by said shafts, respectively, a grain-supporting floor of the binder adapted to oscillate vertically, a rock-shaft located underneath the binder-floor and extended transversely to the vertical plane of the path of the grain through the binder and having a lever-arm on each side of said plane, and mechanism, substantially as described, whereby said lever-arms actuate the needle rock-shaft and the knotter-wheel, respectively, to adjust them on their shafts, said rock-shaft being cranked to form an offsetting portion underneath the binder-floor, said offsetting portion serving to support the floor and standing off from the axis of the shaft in the opposite direction from that of the lever-arms, whereby the rocking of the shaft adjusts oppositely the binder-floor on one hand and the needle and the knotter-wheel on the other hand, substantially as set forth.

8. In a grain-binder in which the packing mechanism rests while the binding mechanism acts, a wheel and its shaft in the packer-driving train and a clutching device by which the one drives the other in one direction of rotation only, the co-operating parts of said clutching device being normally in engaged position when the packer mechanism rests, substantially as set forth.

9. In a grain-binder, in combination with the clutching mechanism which connects the binder-train to the principal driving-train, the knotter-trip wheel, the trip pivoted thereon and revolving therewith, a lever S, having its fulcrum fixed with respect to the axis of the knotter-driving shaft and actuated and latched by the trip when it revolves and rests, respectively, a lever $S^3$ $S^4$, pivoted on the binder-frame and adapted to protrude into the path of rotation of the clutch-dog of the clutching mechanism, a spring reacting upon said lever to throw it out of said path, and an elastic connection between said lever and the lever S, substantially as and for the purpose set forth.

10. In a grain-binder, in combination with the mechanism which clutches the binder-train to the continuously-operating driving-train, the binder-trip wheel, the trip-lever pivoted thereon and revolving therewith, the lever S, having its fulcrum fixed with respect to the axis of the knotter-driving shaft, a lever $S^3$ $S^4$, fulcrumed on the binder-frame and adapted to protrude into the path of the clutch-dog of the clutching mechanism to trip the same, a spring reacting upon said lever to throw it out of said path, and a lever elastically connected to the lever $S^3$ $S^4$ and actuated by the lever S, substantially as and for the purpose set forth.

11. In a grain-binder, in combination with the binder-frame arms and the knotter-driving shaft having fixed bearings therein, the knotter-frame and mechanism including the trip adjustable longitudinally on such shaft, and a lever fulcrumed on the knotter-frame actuated by the trip, the clutching mechanism, and a system of levers on the binder-frame, whereby the dog of the clutching mechanism is tripped, a lever-arm of such system which engages the lever fulcrumed on the knotter-frame, said lever-arm having the offset $S^{20}$ extending parallel to the knotter-driving shaft constituting means of engaging the lever ef the knotter-frame, whereby such engagement is rendered unaffected by the adjustment of the knotter-frame and mechanism on the driving-shaft, substantially as set forth.

12. In a self-binding harvester, in combination with the principal driving-train and the knotter-driving train adapted to be disconnected from the principal train and come to rest at intervals, a train of mechanism which drives the mechanism which feeds the grain to the binder, a clutching device which connects said mechanism to the principal driving-train, a lever which operates said clutch, the oppositely-inclined cam-tracks $A^{42}$ and $A^{43}$ on said lever, and the arm $I^7$ of the binder-driving shaft adapted to engage said cam-tracks, whereby the lever is caused to throw the clutch into engagement at the closing part of the binder's action and to disengage it when the binder-shaft operates, substantially as set forth.

13. In combination, substantially as set forth, the clutch which connects the principal driving-train to the binder-feeding mechanism train, the binder-driving shaft, and the lever $A^4$, which operates said clutch, and an arm on the binder-shaft which operates said lever, the lever having a yielding fulcrum on the binder-frame.

14. In combination with the clutch-wheel $A^{24}$, the lever $A^4$, which engages said wheel to shift it in the direction of its axis, a stud $d^5$, extending through the lever transversely to the plane of rotation of the wheel, the aperture in the lever through which the stud passes being free to permit the lever to rock in a plane containing the axis of the stud, and the spring $d^{50}$, coiled on the stud and bearing against the lever and constituting a yielding fulcrum for the latter in such rocking movement, substantially as set forth.

15. In a grain-binder, in combination with the binder-frame, a horizontally-pivoted end-gate, a system of levers which operate it, the vertical binder-driving shaft having the arm $I^7$, the lever $A^4$, having the oppositely-sloping cam-tracks $A^{42}$ and $A^{43}$ in position to be engaged by the extremity of the arm $I^7$ toward the commencement and end, respectively, of the rotation of the latter, said lever-arm $A^4$ being connected to and operating the system of levers which operate the end-gate, substantially as set forth.

16. In a grain-harvester, in combination with a grain-supporting ledge back of the finger-bar, the upwardly-extending and horizontally-operating conveyer erected at the rear of such ledge and the upwardly-projecting lip or flange at the forward edge of the ledge, substantially as and for the purpose set forth.

17. In a grain-harvester, in combination with the grain-supporting ledge back of the finger-bar, an upwardly-extending and horizontally-operating conveyer erected at the rear of such ledge and the upwardly-projecting lip or flange at the forward edge of the ledge, the conveyer comprising an endless chain carrying butt-actuating fingers which rest upon the ledge as they are carried grainward by the chain, such fingers projecting across the ledge approximately to the lip, substantially as set forth.

18. In a grain-harvester, in combination with the conveying mechanism which carries the grain standing on end stubbleward from behind the sickle and a low fence interposed in the path of the grain toward the bottom or butts, such fence leaning in the direction of advance of the grain and adapted to yield onward and downward under the pressure of the advancing grain, substantially as and for the purpose set forth.

19. In a grain-harvester, in combination with the grain-supporting ledge, an upstanding conveyer comprising the horizontally-traveling butt-carrying fingers resting on the ledge as they move, a fence interposed in the path of advance of the grain far enough above the ledge to permit the butt-carrying fingers to pass under it, extending thence upward several inches, leaning in the direction of advance of the grain, and yielding elastically downward and onward under the pressure of the grain, substantially as and for the purpose set forth.

20. In a grain-harvester, in combination with the grain-supporting ledge back of the finger-bar and the upwardly-extending conveyer erected at the rear of such ledge, said conveyer comprising endless toothed chains traveling around suitable wheels and adapted to carry the grain stubbleward from behind the sickle and then rearward, while the chains pass around their respective wheels at their delivery end, a rearwardly-leaning fence which is low relatively to the ordinary height of the grain interposed in the path of the grain at the delivery end of the conveyer and adapted to yield down and rearward under the pressure of the grain from in front, substantially as set forth.

21. In combination with the grain-supporting ledge and the butt-carrying fingers traveling stubbleward upon it and thence rearward, the guard $C^2$, constituting the stubbleward boundary of the rearward path of the grain, and the spring-leaves $C^5$, secured to the guard $C^2$, extending across the rearward path of the grain just above the track of the butt-carrying fingers and leaning rearward, constituting an inclined and downwardly and rearwardly yielding fence, substantially as and for the purpose set forth.

22. In a grain-harvester in which the grain is carried standing on end and away from behind the sickle, in combination with a grain-supporting base, the upstanding conveyer in the rear thereof, comprising the head carrying rakes and their driving-chains, said rakes having horizontal movement toward and from the delivery end and each passing around one wheel only at the delivery end of the conveyer, and the butt-carrying chain traveling horizontally, and two wheels around which said chain passes at the delivery end, one of said wheels being rearward from the other, substantially as and for the purpose set forth.

In testimony whereof I have hereunto set my hand, in the presence of two witnesses, at Chicago, Illinois, this 4th day of April, A. D. 1889.

FRANK W. COLBY.

Witnesses:
A. L. UPTON,
ARTHUR JOHNSON.